(12) United States Patent
Fiedler et al.

(10) Patent No.: US 10,531,995 B2
(45) Date of Patent: Jan. 14, 2020

(54) PATIENT SUPPORT PLATE INCLUDING ACCESSORY PART

(71) Applicant: TRUMPF MEDIZIN SYSTEME GMBH+ CO. KG, Saalfeld (DE)

(72) Inventors: Kevin Fiedler, Uhlstadt-Kirchhasel (DE); Arnd Kuchenbecker, Saalfeld (DE); Carmen Ludwig, Saalfeld (DE)

(73) Assignee: TRUMPF MEDISIN SYSTEME GMBH + CO. KG, Saalfeld (DE)

( * ) Notice: Subject to any disclaimer, the term of this patent is extended or adjusted under 35 U.S.C. 154(b) by 323 days.

(21) Appl. No.: 15/704,432

(22) Filed: Sep. 14, 2017

(65) Prior Publication Data

US 2018/0078435 A1    Mar. 22, 2018

(30) Foreign Application Priority Data

Sep. 16, 2016 (DE) .......................... 10 2016 217 803

(51) Int. Cl.
*A47B 7/00* (2006.01)
*A61G 7/015* (2006.01)
(Continued)

(52) U.S. Cl.
CPC ............. *A61G 7/015* (2013.01); *A61G 7/018* (2013.01); *A61G 7/05* (2013.01); *F16H 1/16* (2013.01);
(Continued)

(58) Field of Classification Search
CPC ...... A61G 13/08; A61G 13/04; A61G 13/101; A61G 7/015; A61G 7/018; A61G 7/05;
(Continued)

(56) References Cited

U.S. PATENT DOCUMENTS 5,564,852 A * 10/1996 Maxwell ................. F16C 11/10
                                                               403/171
6,023,800 A *  2/2000 Stickley ............... A61G 7/0507
                                                              248/229.26
(Continued)

FOREIGN PATENT DOCUMENTS

DE    102005054174 A1    5/2007
WO    WO2002/055001     7/2002

OTHER PUBLICATIONS

Office Action from the German Patent Office for DE102005054174A1, dated Apr. 12, 2017.
European Search Report for EP17191227.2, dated Dec. 20, 2017.

*Primary Examiner* — Nicholas F Polito
*Assistant Examiner* — Morgan J McClure
(74) *Attorney, Agent, or Firm* — Barnes & Thornburg LLP

(57) ABSTRACT

The invention provides a patient supporting plate (2) consisting of at least one first and one second patient supporting components (3, 4) and an accessory part (7). The first or the second patient supporting component (3, 4) is provided with a hinge (5) having a swivel axis (6). The hinge (5) has a drive element (11) for swiveling the patient supporting components (3, 4), as well as at least one coupling element (8) for coupling the first patient supporting component to the second patient supporting component (3, 4). The drive element (11) and the coupling element (8) are arranged juxtaposed in the direction of the swivel axis (6) and can be fastened to one another by means of at least one first detachable fastening element (17). The accessory part (7) can be fastened to the coupling element (8) by means of the first detachable fastening element (17) or a second detachable fastening element (24), by providing a first through opening (14) running in the direction of the swivel axis (6) in the drive element (11) and a second through opening (15) in the coupling element (8) for the first or second fastening element (17, 24) and also an aligned receptacle (16) in the
(Continued)

accessory part (7), so that the fastening element (17, 24) can be inserted into the first opening (14) from the drive element (11) side located opposite the coupling element (8) and connected to the accessory part (7).

13 Claims, 10 Drawing Sheets

(51) Int. Cl.
  *A61G 7/018*     (2006.01)
  *A61G 7/05*      (2006.01)
  *F16H 1/16*      (2006.01)
  *A61G 7/057*     (2006.01)
  *F16H 57/039*     (2012.01)
  *F16H 57/02*     (2012.01)

(52) U.S. Cl.
  CPC ........ *A61G 7/0503* (2013.01); *A61G 7/05715* (2013.01); *A61G 7/05792* (2016.11); *F16H 57/039* (2013.01); *F16H 2057/02039* (2013.01)

(58) Field of Classification Search
  CPC .............. A61G 7/0503; A61G 7/05792; A61G 7/05715; A61G 7/05723; A61G 7/05769; F16H 1/16; F16H 57/039; F16H 2057/02039
  See application file for complete search history.

(56) References Cited

U.S. PATENT DOCUMENTS

| | | | | |
|---|---|---|---|---|
| 6,678,908 | B2* | 1/2004 | Borders | A61G 13/10 5/600 |
| 7,818,839 | B2* | 10/2010 | Koch | A61G 13/08 5/610 |
| 2002/0128577 | A1* | 9/2002 | Smart | A61F 5/04 602/36 |
| 2002/0170115 | A1* | 11/2002 | Borders | A61G 12/00 5/600 |
| 2006/0293589 | A1* | 12/2006 | Calderon | A61G 7/1019 600/415 |
| 2007/0116512 | A1* | 5/2007 | Katzenstein | A61G 13/12 403/322.4 |
| 2009/0169831 | A1* | 7/2009 | Malcolm | A61G 13/101 428/192 |
| 2012/0260429 | A1* | 10/2012 | Rolfes | A61G 13/101 5/637 |
| 2013/0206149 | A1* | 8/2013 | Spendley | A61G 13/08 128/845 |
| 2013/0247301 | A1* | 9/2013 | Daley | A61G 13/129 5/613 |
| 2015/0297432 | A1* | 10/2015 | Poulos | A61G 5/14 5/610 |
| 2016/0287461 | A1* | 10/2016 | Naughton | A61G 13/04 |
| 2017/0296413 | A1* | 10/2017 | Won | A61G 7/015 |

* cited by examiner

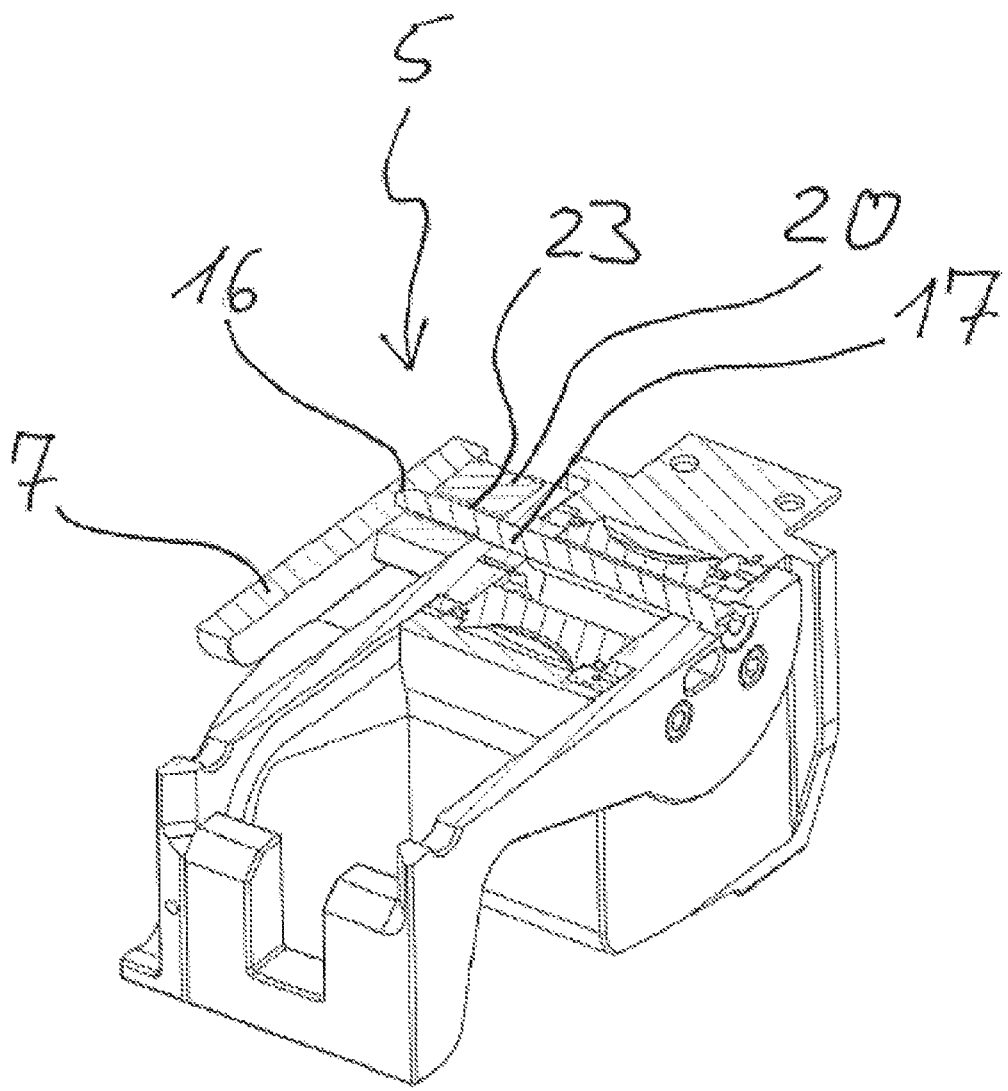

PATIENT SUPPORT PLATE INCLUDING ACCESSORY PART

CROSS REFERENCES TO RELATED APPLICATION

This application claims the benefit of and priority to German Patent Application Serial No. 102016217803.2, filed on Sep. 16, 2016, which is incorporated herein by this reference in its entirety.

The invention relates to a patient supporting plate with an accessory part, more particularly with an accessory part which is mounted to the patient supporting plate in the region of a hinge.

Patient supporting plates, on which fastening rails, to which medical apparatuses or tools can be fastened, are mounted laterally and/or to the end faces as accessory parts, are known from the prior art. The fastening rails are usually provided with through holes with countersinks, the rails being bolted to a frame of the patient supporting plate through said through holes. However, these processes produce gaps between screw heads and the countersinks, wherein said gap deteriorates the hygienic conditions. Therefore, the through holes with countersinks are sealed with covering caps on a case-by-case basis. This, however, involves additional expenditure and presents the risk of the covering caps dropping off.

Document U.S. Pat. No. 6,678,908 B2 discloses additional supporting elements for patient supporting plates in order to widen the supporting surface for overweight patients. These additional supporting elements encompass around a patient supporting surface of the patient supporting plate and can be pinned to the lateral fastening rails of the patient supporting plate. Lateral fastening rails for attaching the medical apparatuses or tools are likewise provided on said additional supporting elements. Said lateral fastening rails are fastened to the additional supporting elements from the inside by means of fastening screws, thereby permitting a smooth homogeneous surface on the outside of the fastening rails, which prevents hygienic conditions being deteriorated and eliminating the need for additional cover caps.

However, such fastening of the lateral fastening rails in the region of hinges between plate segments of the patient supporting plate is highly complex due to the structural design of the hinges. Moreover, the hinge needs to be dismantled for retrospective disassembly of the fastening rails.

Therefore, the invention addresses the problem of improving a patient supporting plate in such a manner that the aforementioned problems are solved, and the structure of the hinges on the patient supporting plate are optimized.

The problem is solved by a patient supporting plate according to claim 1. Advantageous developments are the subject matter of the dependent claims.

The invention will now be elucidated in terms of an embodiment and by making reference to the attached drawings.

More particularly:

Figure 1:
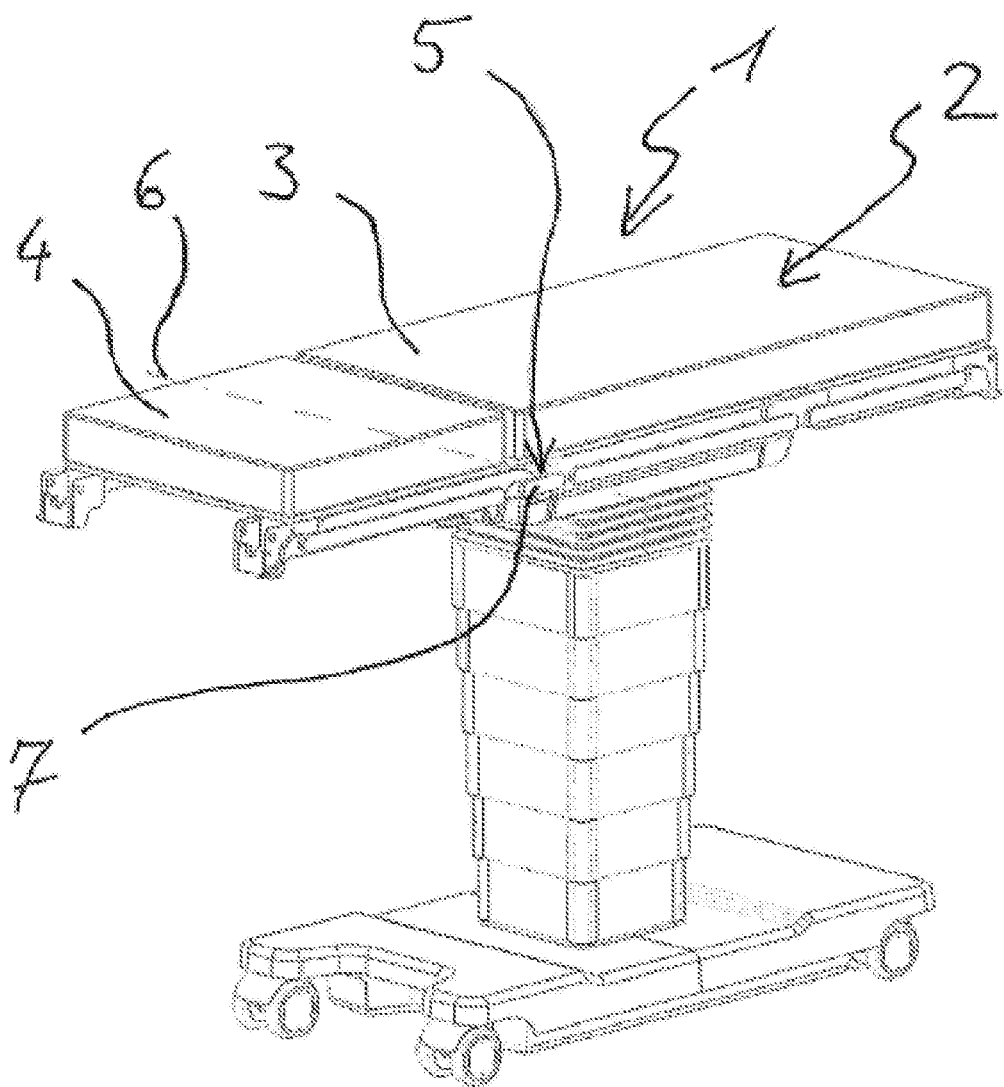
FIG. 1 shows an operating table having a patient supporting plate with hinges and one fastening rail at one of the hinges.

FIG. 1 shows an operating table 1 having a patient supporting plate 2, which has a first patient supporting component 3 and a second patient supporting component 4. The first patient supporting component 3 is coupled to the second patient supporting component 4 for swivel movement via a hinge 5. The hinge 5 is provided at the first patient supporting component 3 and the second patient supporting component 4 can be coupled to the hinge 5. Alternatively, the hinge 5 is provided at the second patient supporting component 4 and the first patient supporting component 3 can be coupled to the hinge 5. The hinge 5 has a swivel axis 6 for swiveling the first patient supporting component 3 and the second patient supporting component 4 towards one another.

Moreover, a fastening rail 7 is attached to the hinge 5 as an accessory part.

Figure 2:
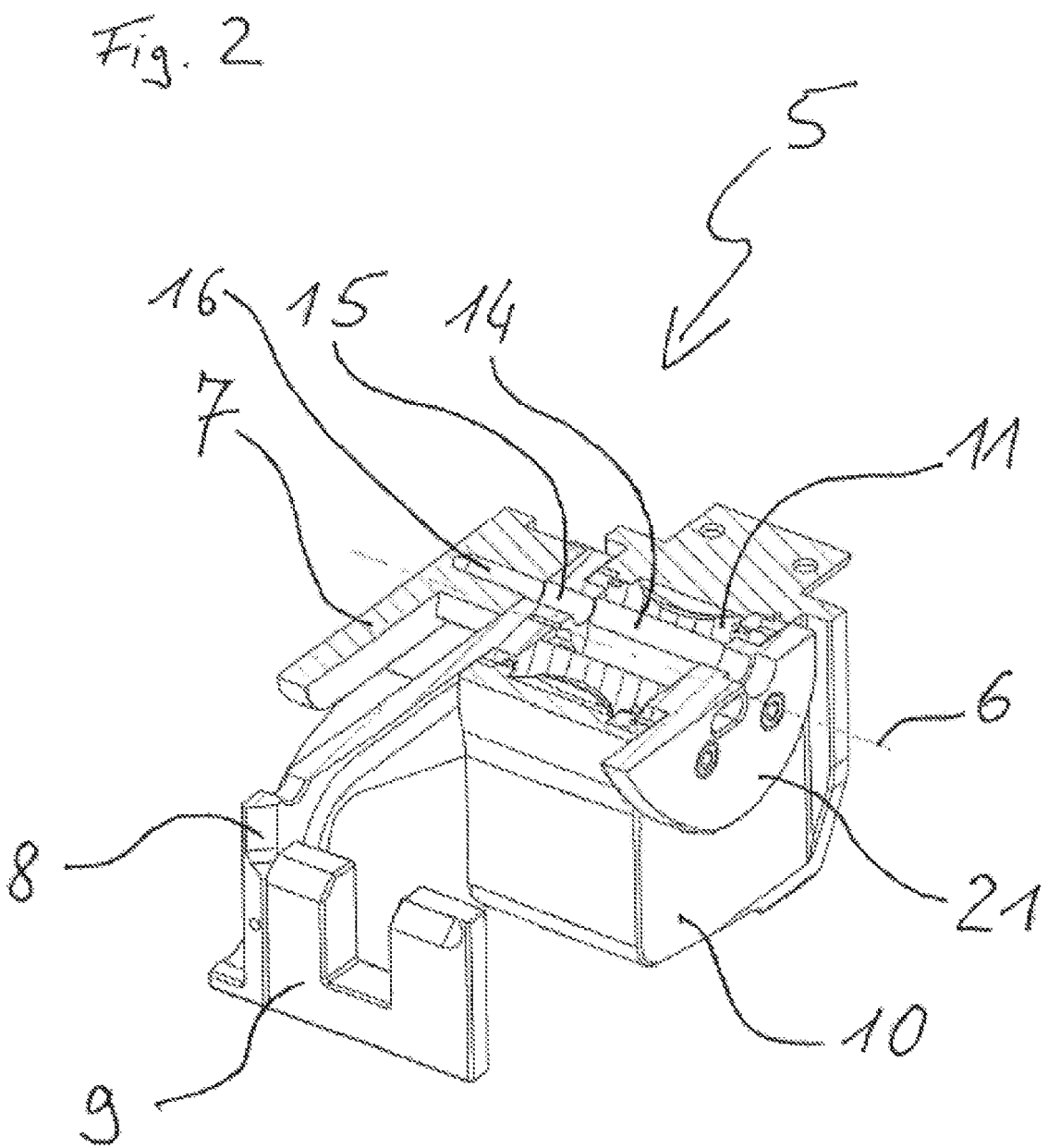
FIG. 2 shows a sectional view through one of the hinges of the patient supporting plate with the fastening rail and with a drive device.

FIG. 2 shows a sectional view through the hinge 5. The hinge 5 has a coupling element 8. The coupling element 8 has a coupling device 9, so that the first patient supporting component can be coupled to the second patient supporting component 3, 4, or the second patient supporting component can be coupled to the first patient supporting component 4, 3 via the coupling element 8.

Moreover, the hinge 5 is shown with the fastening rail 7 and provided with a drive device 10. The drive device 10 has a drive element 11, which is described later on.

The drive element 11 can be fastened arranged in the direction of the swivel axis 6 on the coupling element 8. For this purpose, it is provided with a first through opening 14. The drive element 11 is not necessarily arranged on the swivel axis 6. A position of the first through opening 14 is selected such that it is also accessible when the hinge 5 has been installed in the operating table 1. The coupling element 8 is provided with a second through opening 15. A washer 21 shown in FIG. 2 can be optionally present but is not essential.

Moreover, the fastening rail 7 is attached to the hinge 5 as described below. The fastening rail 7 is provided with a receptacle 16. As shown here, the receptacle 16 does not pass continuously through the fastening rail, and so the fastening rail has a surface, facing away the drive element 11, which is smooth and homogeneous.

Figure 3:
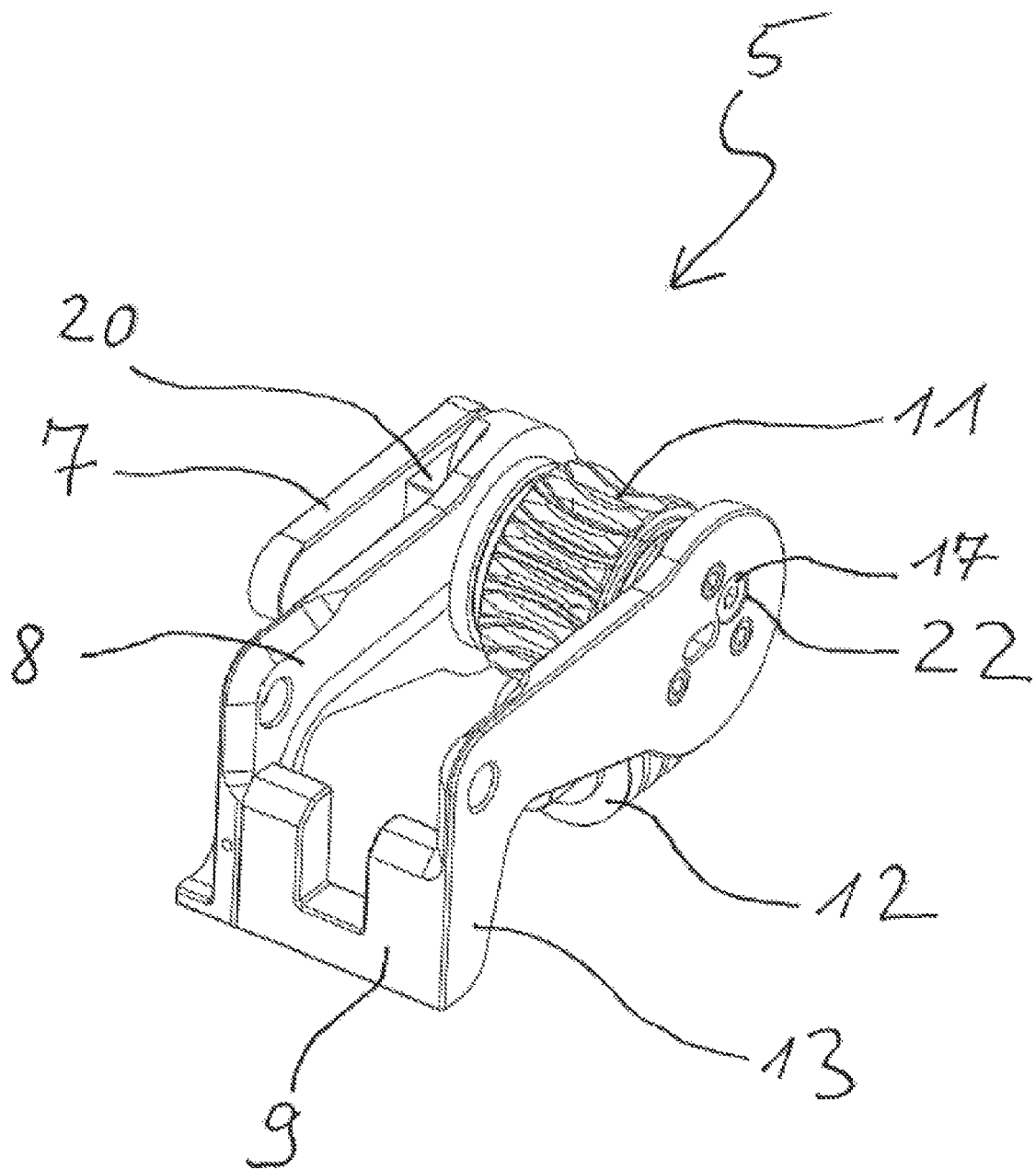
FIG. 3 shows a view of the hinge in FIG. 2 without a drive device housing, having a drive element, and having an optional further coupling element.

FIG. 3 shows a view of the hinge 5 without a housing for the drive device 10. It is therefore clear that the drive device 10 has the drive element 11 in the form of a worm wheel. Moreover, the drive device 10 is provided with a drive worm 12. In this case, therefore, the drive device 10 is a worm gear. Alternatively, however, it can also be a lever mechanism which is driven by means of an electrical linear drive or a pneumatic or hydraulic cylinder. The drive element 11 is then designed as a drive lever.

As shown in FIG. 3, the hinge 5 is provided with an optional further coupling element 13. The further coupling element 13 is located opposite the coupling element 8 with respect to the drive element 11. Moreover, the further coupling element 13 has an opening 22, in this case a through opening and a cylindrical countersink, for inserting a first fastening element 17, which is described later on. The further coupling element 13 is connected to the coupling element 8 via the coupling device 9. A higher stiffness and load-bearing capacity of the hinge 5 can thereby be achieved.

FIG. 3 also shows that a spacer 20 is provided between the fastening rail 7 and the coupling element 8.

Figure 4:
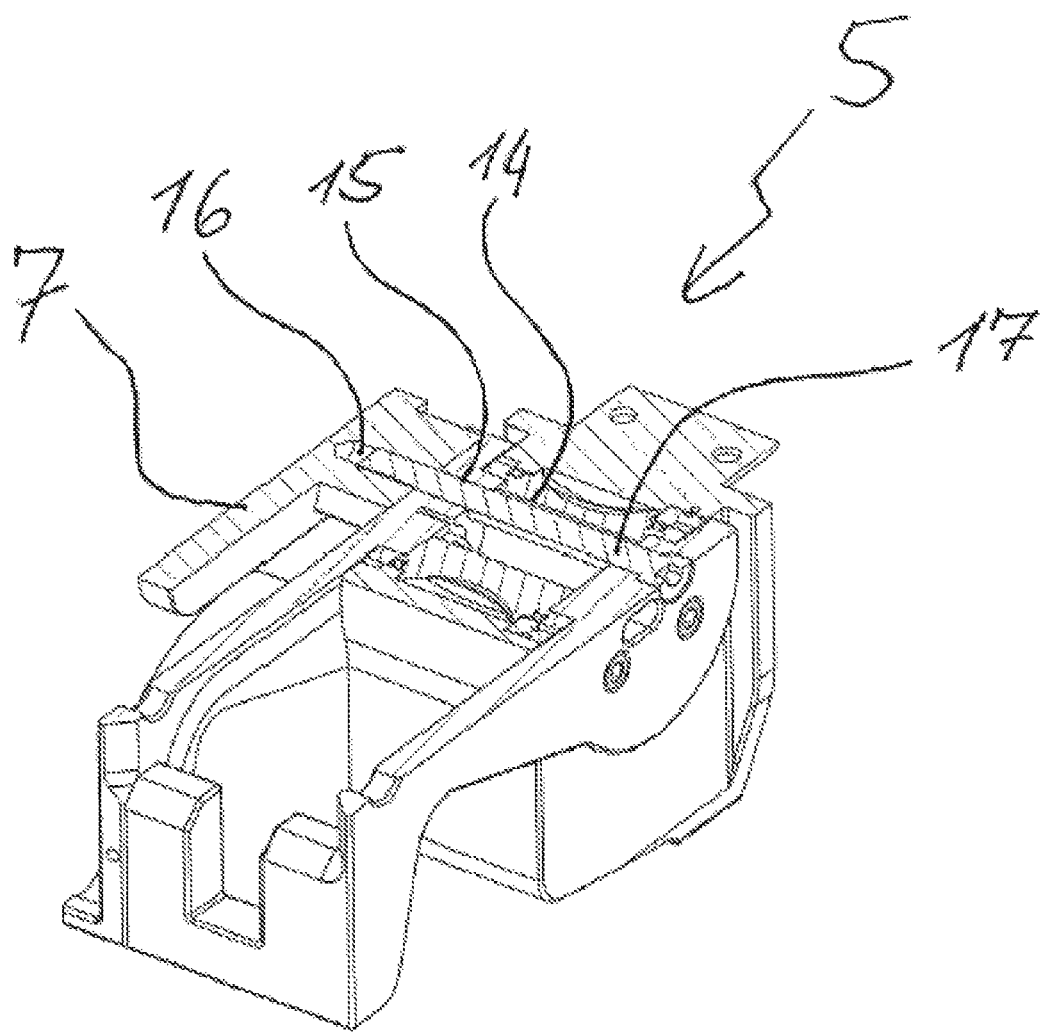
FIG. 4 shows a sectional view through the hinge having a fastening element for the accessory part.

FIG. 4 shows a sectional view through the hinge 5 with the first fastening element 17 of the fastening rail 7. In this case, the first fastening element 17 is a screw. It can, however, also be another detachable fastening element based on the principle of a bayonet closure, for example.

In order to mount the hinge 5, the first fastening element 17 is inserted through the first through opening 14 of the drive element 11 and the second through opening 15 of the coupling element 8 from the side of the drive element 11 located opposite the coupling element 8 is inserted through the first through opening 14 of the drive element 11 and the second through opening 15 of the coupling element 8 and, in the receptacle 16, this having a nut thread in this instance, it is connected, i.e. in this case bolted, to the detachable fastening rail 7. This allows the fastening rail 7 to be simply removed, for a replacement for instance, without having to completely dismantle the hinge 5. Alternatively, multiple first fastening elements 17 can be used. Insofar as only one fastening element 17 is used, it would seem appropriate to connect the fastening rail to the coupling element 8 by means of a positive connection.

Figure 5:
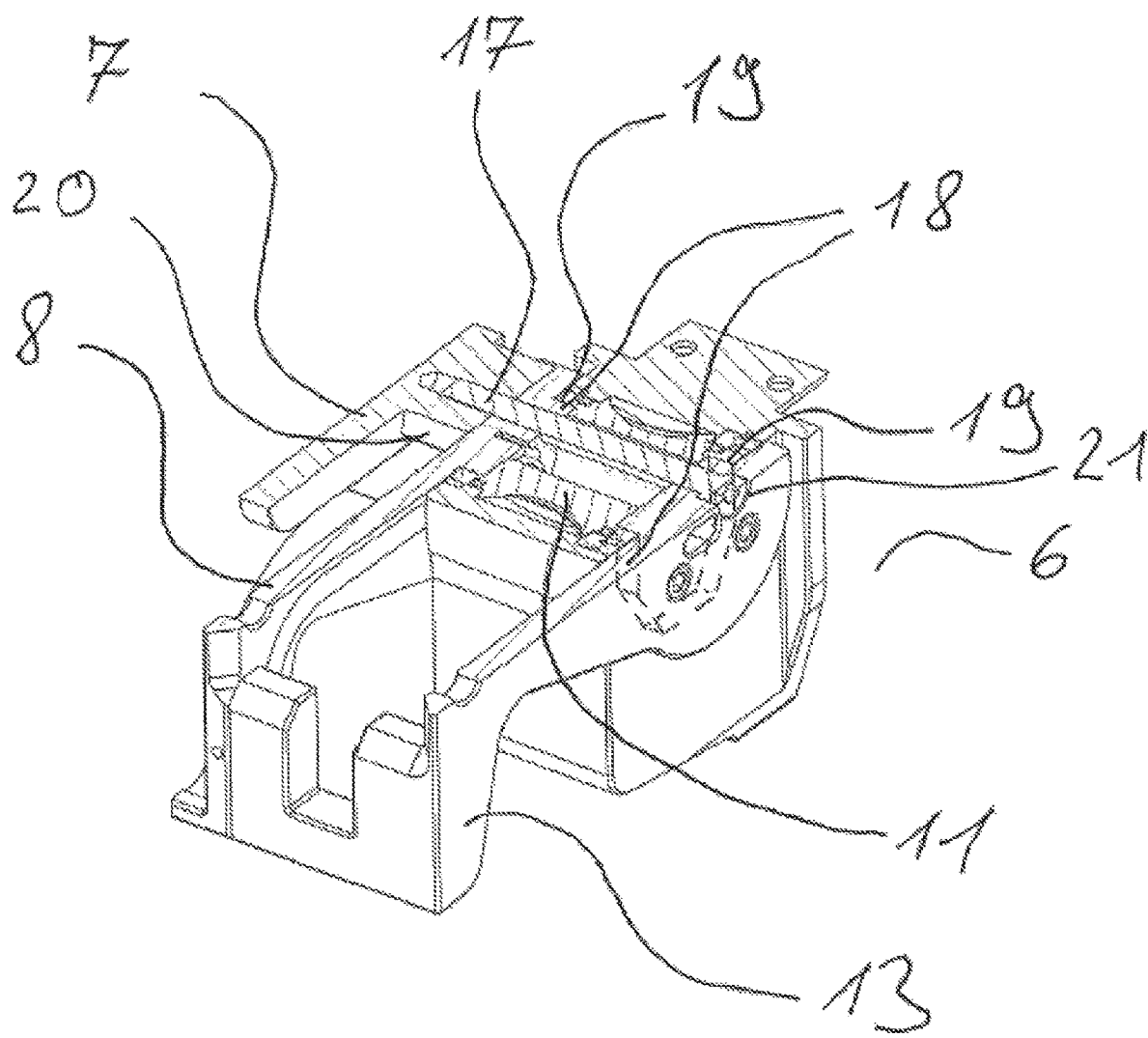
FIG. 5 shows a sectional view through the hinge having form-fitting elements between the optional further coupling element and the drive element.

FIG. 5 shows a sectional view through the hinge 5. In this case, a first form-fitting element 18 is shown at the optional further coupling element 13 and a second form-fitting element 19 at the drive element 11. These form-fitting elements 18, 19, shown with dotted lines, form a positive connection between the optional further coupling element 13 and the drive element 11.

A positive connection between the coupling element 8 and a further first form-fitting element 18 and between the drive element 11 and a further second form-fitting element 19 is also possible. In the interest of clarity, this is not shown here graphically. Hence, the positive connection is provided either between the drive element 11 and the coupling element 8 and/or between the drive element 11 and the further coupling element 13. In addition to the first fastening element 17 for a positive connection with the drive element 11, the form-fitting elements 18, 19 are provided with the coupling element 8 or with the further coupling element 13. These form-fitting connections can be designed with practically no backlash and are able to transmit a high torque.

The first form-fitting elements 18 are formed at the coupling element 8 or at the further coupling element 13 by means of an elevation in the direction of the swivel axis 6. Each of the second form-fitting elements 19 are formed by means of an indentation on the drive element 11. The first and second form-fitting elements 18, 19 are complementary and designed to transmit a high torque. In this case, the form-fitting elements 18, 19 have the contour of a hexagon in the direction of the swivel axis 6. Alternatively, the indentation can also be provided in the coupling element 8 and in the further coupling element 13, and the elevation can be provided at the drive element 11. Alternatively, the contour of the form-fitting elements 18, 19 can have a different form, pentagonal or oval for example, as long as a high torque can be transmitted.

Figure 6A:
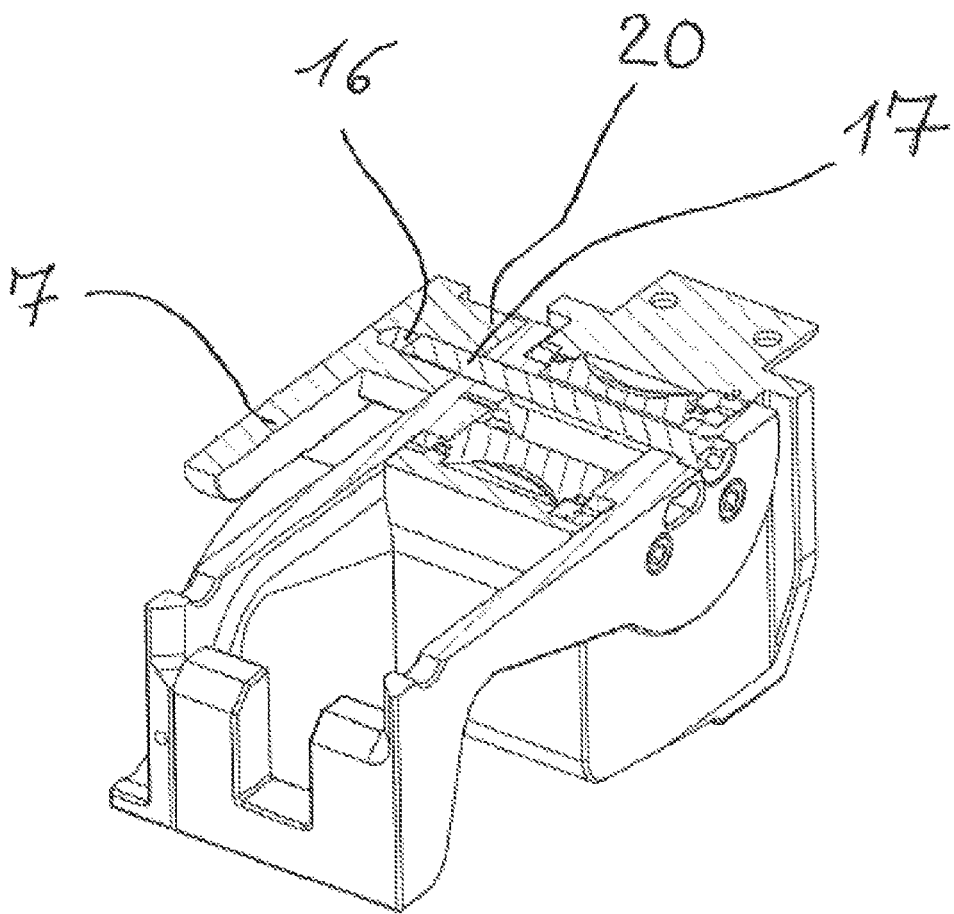
FIG. 6a show various spacers through to 6c for the accessory part.

The spacer 20 is fastened to the fastening rail 7 or integrated therein. FIG. 6a shows the fastening rail 7 having an integrated spacer 20. In this case, the spacer 20 is provided with the receptacle 16 for the first fastening element 17 described above.

Figure 6B:
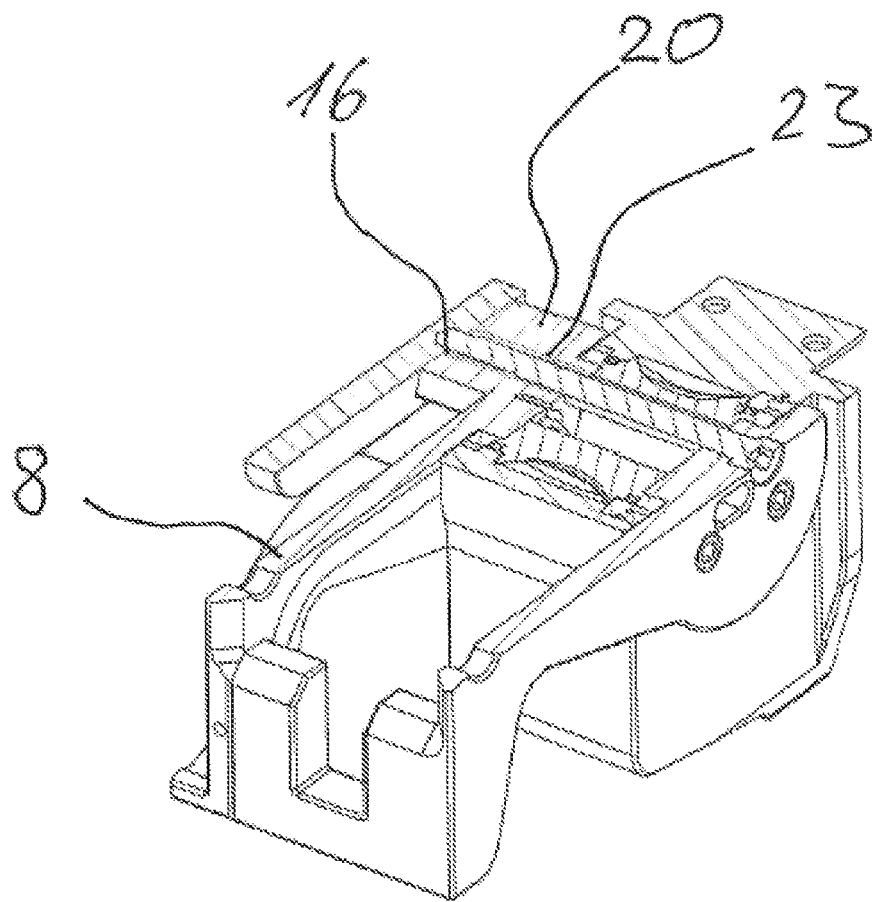

Alternatively, the spacer 20 can also be fastened, as shown in FIG. 6b, to the coupling element 8 or integrated therein. In this case, the spacer is an elevation on the coupling element 8. As a further alternative, as shown in FIG. 6c, the spacer 20 is a separate component. In such cases, the spacer is provided with a third through opening 23 for the fastening element 17, and the fastening rail 7 is provided with the receptacle 16 for the first fastening element 17, so that the fastening element 7 can be fastened to the hinge 5.

Figure 7:
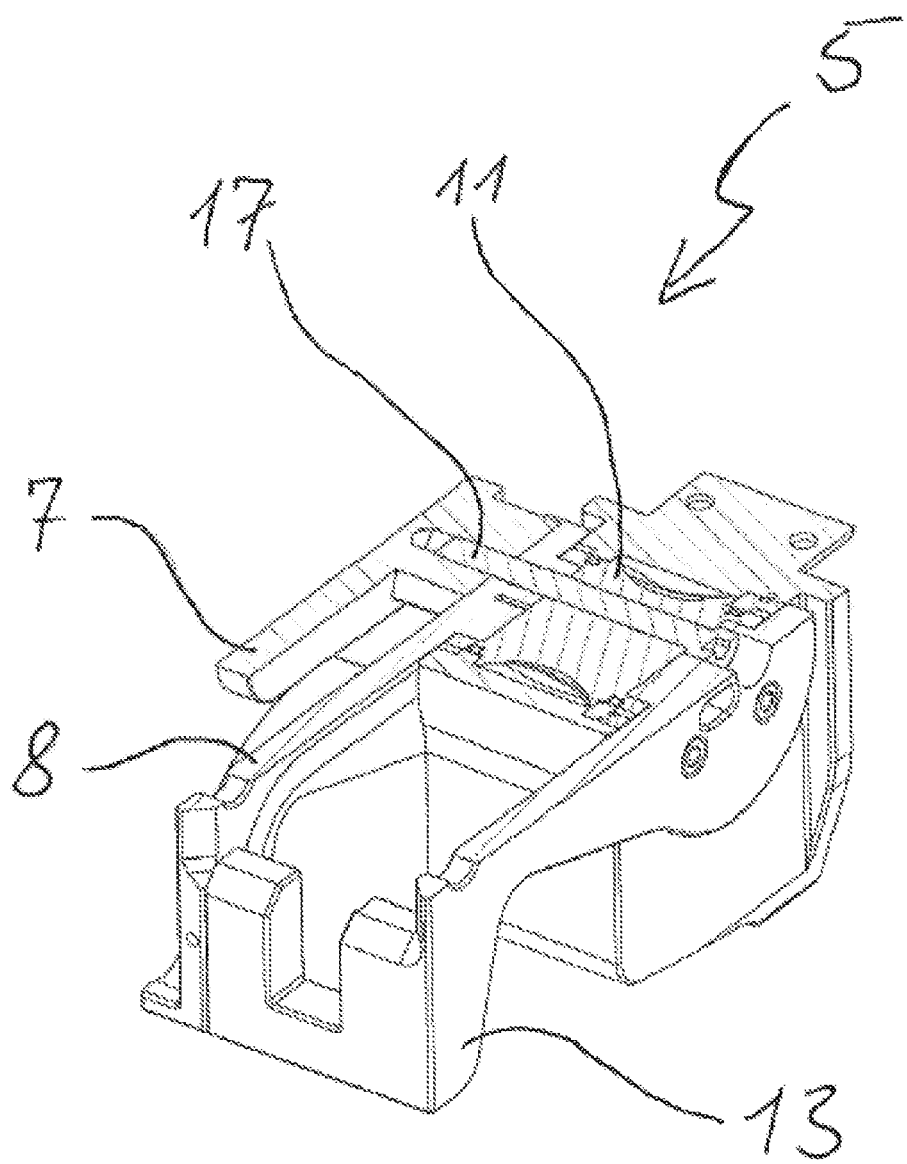
FIG. 7 shows a sectional view through the hinge with a further configuration for attaching the fastening element.

FIG. 7 shows a sectional view through the hinge 5 having, in view of FIG. 4, a further configuration for the attachment of the fastening rail 7. In FIG. 7, the first fastening element 17 connects merely the drive element 11 and the coupling element 8 to the fastening rail 7, whereas in FIG. 4, the second coupling element 13 is also fastened by the fastening element 17.

Figure 8:
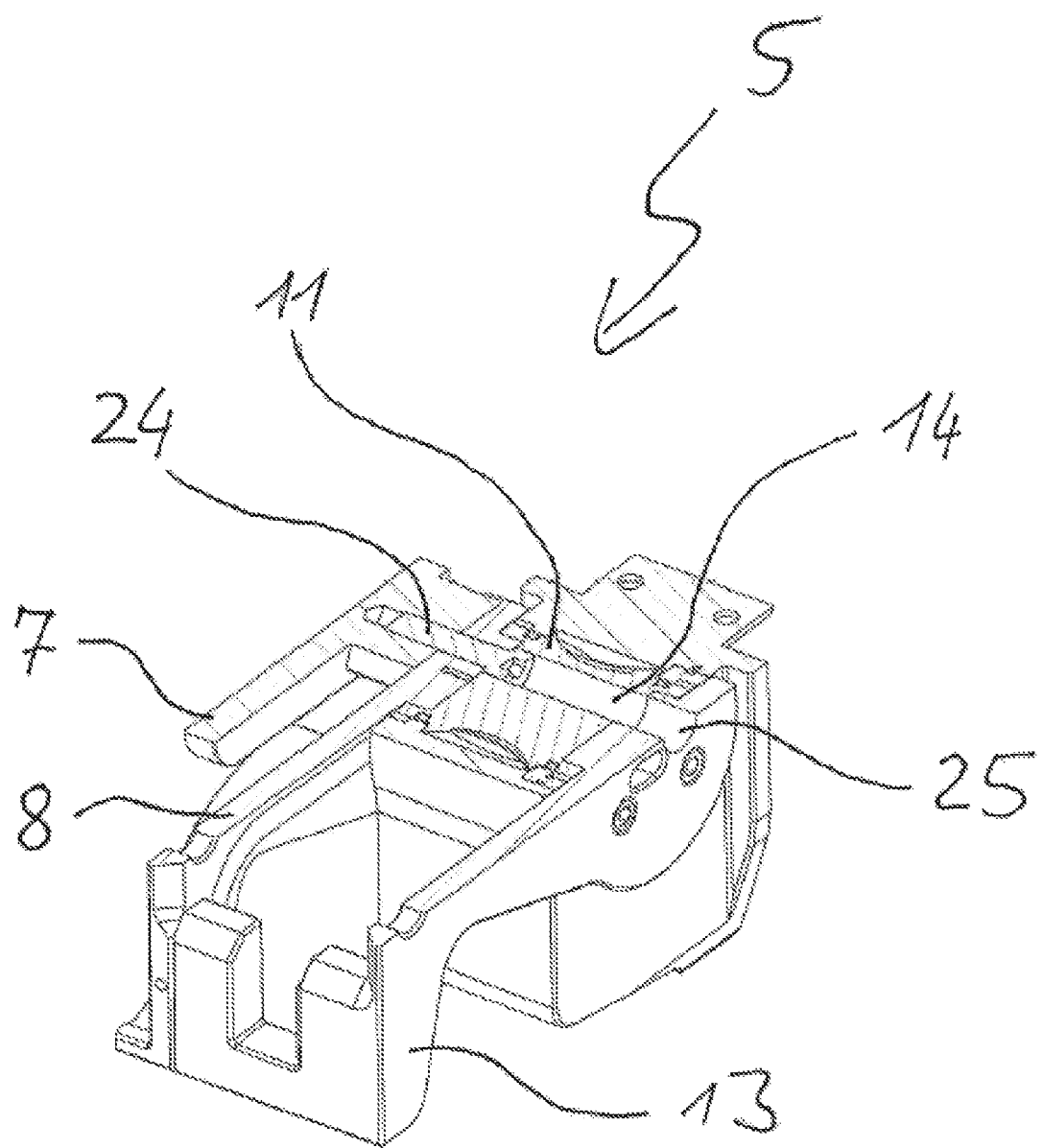
FIG. 8 shows a sectional view through the hinge with a different further configuration for attaching the fastening element.

FIG. 8 shows a further configuration for attaching the fastening rail 7 to the hinge 5. In this case, the fastening rail 7 is not, as in FIG. 7 for example, fastened by means of the first fastening element 17 by which the drive element 11 and the coupling element 8 are connected to the fastening rail 7. Instead, it is fastened by means of a second detachable fastening element 24, which connects merely the coupling element 8 and the fastening rail 7. The second fastening element 24 can be inserted through the through opening 14 of the drive element 11 and through a further opening 25 in the second coupling element 13, wherein the second coupling element 13 is not mandatory, however. Insofar as the fastening rail is connected by means of the second fastening element 24, it is not essential for the drive element 11 and the coupling element 8 to be connected by means of a detachable coupling element.

All the features shown in the description, the claims below and the drawings can be essential to the invention both individually and also in any combination with one another.

What is claimed is:
1. A patient supporting plate consisting of at least one first and one second patient supporting components and an accessory part, wherein
  the first or the second patient supporting component is provided with a hinge having a swivel axis, and the patient supporting components can be coupled for swivel movement via the hinge,
  wherein the hinge has a drive element for swiveling the patient supporting components towards one another around the swivel axis, as well as
  at least one coupling element for coupling the first patient supporting component to the second patient supporting component,
  wherein the drive element and the coupling element are connected juxtaposed in the direction of the swivel axis, and the accessory part can be fastened to the coupling element by means of a first detachable fastening element, which passes through the drive element and the coupling element, or by means of a second detachable fastening element, which passes only through the coupling element,
  by providing a first through opening running in the direction of the swivel in the drive element and a second through opening in the coupling element for the first or second fastening element, and also a receptacle, aligned with the first and second openings, in the accessory part, so that the at least first or second fastening element can be inserted into the first opening from the drive element side located opposite the coupling element and connected to the accessory part.

2. The patient supporting plate as claimed in claim 1, wherein the accessory part is designed as a fastening rail.

3. The patient supporting plate as claimed in claim 1, wherein the accessory part has a surface facing away from the drive element, which is smooth and homogeneous.

4. The patient supporting plate as claimed in claim 1, wherein at least one spacer is provided between the accessory part and the coupling element, said spacer being connected to the accessory part and having the at least one receptacle for the at least one first or second fastening element for connecting the spacer to the coupling element.

5. The patient supporting plate as claimed in claim 1, wherein at least one spacer is provided between the accessory part and the coupling element, said spacer having at least a third through opening for the at least first or second fastening element, and the accessory part having at least one receptacle for the at least one fastening element for a connection to the coupling element.

6. The patient supporting plate as claimed in claim 5, wherein the spacer is formed as an elevation of the coupling element.

7. The patient supporting plate as claimed in claim 5, wherein the spacer is designed as a separate component.

8. The patient supporting plate as claimed in claim 1, wherein a further coupling element which, in the direction of the swivel axis, is located opposite the coupling element with respect to the drive element and which has an opening in the direction of the swivel axis for passing through the first or second fastening element, is provided at the hinge.

9. The patient supporting plate as claimed in claim 1, wherein, in addition to the at least one first fastening element, form-fitting elements are provided at the drive element and at the coupling element and/or at the further coupling element, by means of which form-fitting elements a positive connection can be formed between the coupling element and/or the further coupling element and the drive element.

10. The patient supporting plate as claimed in claim 9, wherein the form-fitting elements have an elevation or indentation at the coupling element and/or at the further coupling element in the direction of the swivel axis, and the drive element has a complementary indentation or elevation in the direction of the swivel axis.

11. The patient supporting plate as claimed in claim 10, wherein the elevation and indentation in the direction of the swivel axis each have a contour of a complementary hexagonal shape.

12. The patient supporting plate as claimed in claim 1, wherein the drive element is a worm wheel.

13. The patient supporting plate as claimed in claim 12, wherein the worm wheel is a component of a drive device having a worm gear.

* * * * *

UNITED STATES PATENT AND TRADEMARK OFFICE
CERTIFICATE OF CORRECTION

PATENT NO. : 10,531,995 B2
APPLICATION NO. : 15/704432
DATED : January 14, 2020
INVENTOR(S) : Kevin Fiedler et al.

Page 1 of 1

It is certified that error appears in the above-identified patent and that said Letters Patent is hereby corrected as shown below:

On the Title Page

Line 1 of item (73) Assignee, delete the single occurrence of "MEDISIN" and insert in its place, --MEDIZIN--.

Signed and Sealed this
Twenty-seventh Day of August, 2024

Katherine Kelly Vidal
*Director of the United States Patent and Trademark Office*